(12) United States Patent
Ott et al.

(10) Patent No.: US 7,954,498 B2
(45) Date of Patent: Jun. 7, 2011

(54) DEVICE FOR THE CREATING OF A HOMOGENEOUS CUT TOBACCO FLOW

(75) Inventors: Christina Ott, Hamburg (DE); Ralf Barkmann, Hamburg (DE); Stefan Harms, Hamburg (DE); Reinhard Hoppe, Tespe (DE); Thomas Jessen, Börnsen (DE); Torben Baumgardt, Hamburg (DE)

(73) Assignee: Focke & Co. (GmbH & Co. KG), Verden (DE)

( * ) Notice: Subject to any disclaimer, the term of this patent is extended or adjusted under 35 U.S.C. 154(b) by 931 days.

(21) Appl. No.: 11/722,575

(22) PCT Filed: Nov. 9, 2005

(86) PCT No.: PCT/EP2005/011962
§ 371 (c)(1),
(2), (4) Date: Jun. 22, 2007

(87) PCT Pub. No.: WO2006/074728
PCT Pub. Date: Jul. 20, 2006

(65) Prior Publication Data
US 2008/0142029 A1 Jun. 19, 2008

(30) Foreign Application Priority Data
Dec. 22, 2004 (DE) .................. 10 2004 063 057

(51) Int. Cl.
*A24B 3/14* (2006.01)
*A24B 15/12* (2006.01)
(52) U.S. Cl. ........ 131/369; 131/108; 131/280; 131/282; 141/83
(58) Field of Classification Search ........................ None
See application file for complete search history.

(56) References Cited

U.S. PATENT DOCUMENTS

| 4,235,248 A | 11/1980 | Schumacher |
| 4,583,571 A | 4/1986 | Focke et al. |
| 5,115,819 A | 5/1992 | Wochnowski et al. |
| 5,331,977 A | 7/1994 | Draghetti et al. |

FOREIGN PATENT DOCUMENTS

| DE | 2 060 100 | 6/1972 |
| DE | 1 812 291 | 7/1973 |
| DE | 33 16 176 | 11/1984 |
| DE | 23 38 374 C2 | 9/1985 |
| EP | 1 364 588 A1 | 11/2003 |

*Primary Examiner* — Richard Crispino
*Assistant Examiner* — Phu H Nguyen
(74) *Attorney, Agent, or Firm* — Sughrue Mion, PLLC

(57) ABSTRACT

In order to treat cut tobacco so as to loosen and homogenize the same, a tobacco stream (12, 16) passes through a plurality of processing stations (18, 19, 20), in the region of which the tobacco is loosened, during transportation, with the aid of different processing arrangements. The tobacco stream or main stream here is divided up into a plurality of smaller sub-streams during treatment.

14 Claims, 4 Drawing Sheets

DEVICE FOR THE CREATING OF A HOMOGENEOUS CUT TOBACCO FLOW

Figure 1:
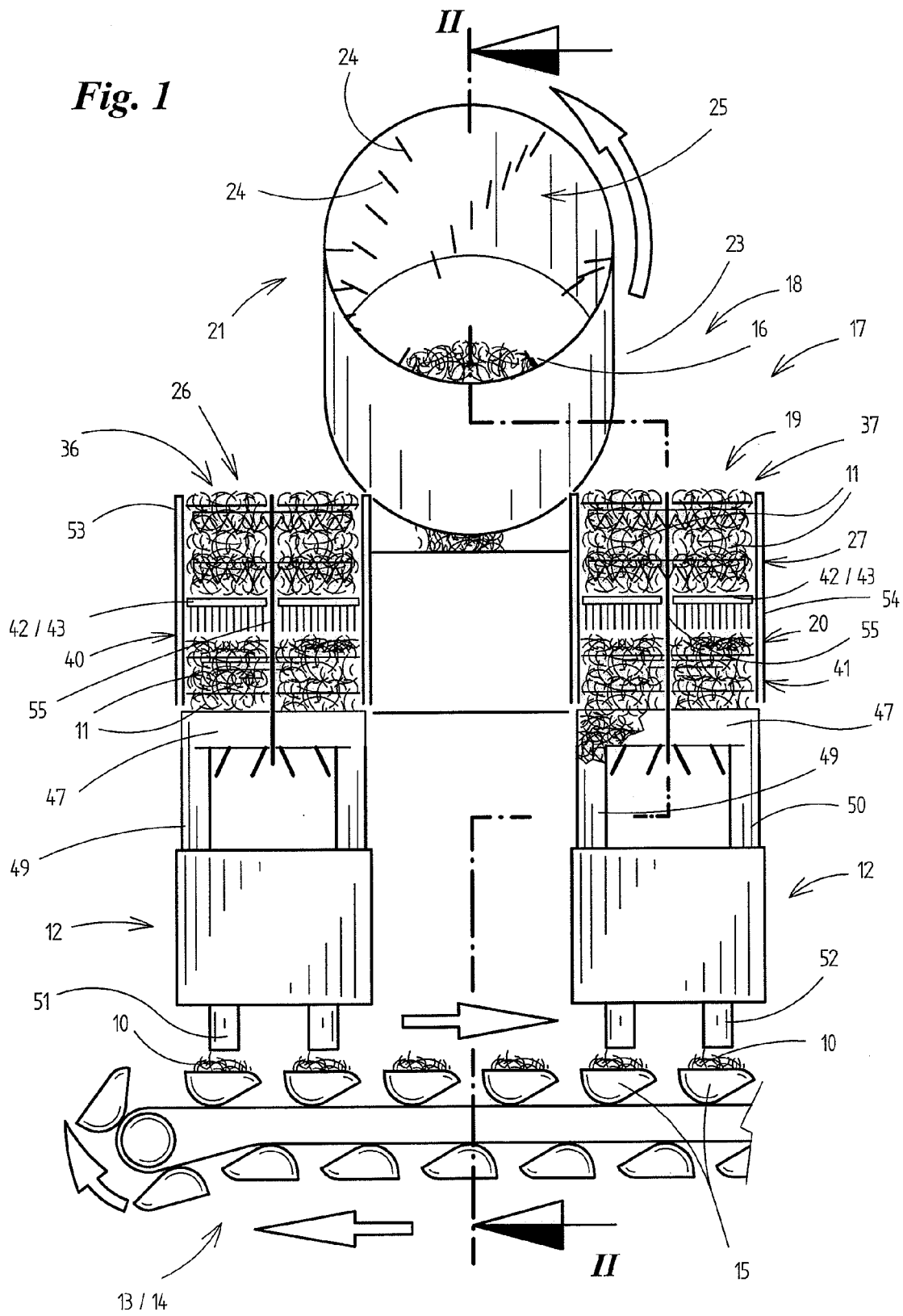

The invention relates to an apparatus for mechanically preparing fibrous material, in particular cut tobacco, for forming a uniformly structured, homogeneous fiber or tobacco stream, from which tobacco portions can be severed.

The invention is concerned primarily with making precise portions of cut tobacco using tobacco scales. The tobacco portions are then packaged. The prepared-composition tobacco is fed in a continuous tobacco stream or tobacco strand. The portions are severed from this and fed to the tobacco scales.

One difficulty is that the structure of the incoming tobacco stream is not uniform. Rather, clumps and other non-uniform structures have to be removed. For this purpose, it is known to use a rotating drum with needles which are arranged on the outside and enter into the fed tobacco stream in order to loosen the same (DE 23 38 374). The result of this method of mechanically preparing the tobacco stream is unsatisfactory.

The object of the invention is to propose an improved apparatus for treating a stream of fibrous material, in particular cut tobacco, which ensures improved uniformity of the fiber stream, but nevertheless reduces the degree to which fibers are destroyed.

In order to achieve this object, the apparatus according to the invention is characterized in that the fiber or tobacco stream passes through a plurality of processing stations one after the other, these stations homogenizing the structure of the tobacco stream in a number of processing steps using, in particular, differently operating arrangements.

The invention is based on the finding that using mechanical arrangements to loosen the tobacco stream in the region of a single station is insufficient. Accordingly, the basic idea of the invention is to use differently designed or differently operating loosening arrangements to process the tobacco stream in a plurality of treatment stations. This results in an optimally, namely uniformly structured tobacco stream and also prevents, or reduces, tearing of tobacco fibers.

A preferably first processing station comprises a drum, or loosening drum, which has needles which project on the inside of a drum casing, to be precise in helically wound rows, the tobacco being conveyed through the preferably inclined drum.

A further, preferably second processing station has a tobacco conveyor with an endless belt and protrusions or carry-along elements which are arranged on this belt and penetrate into the tobacco stream. This tobacco conveyor, preferably designed as a steep conveyor, interacts with a stationary counterpart, in particular a combing belt or a combing roller, which is driven in the opposite direction.

Finally, a third processing station comprises arrangements having a plurality of needles, namely needle combs, which enter into a preferably horizontally conveyed tobacco stream from above and loosen these carefully on account of relative movements.

The tobacco stream which is treated in this way passes into the tobacco scales in order for the portions to be made.

Figure 2:
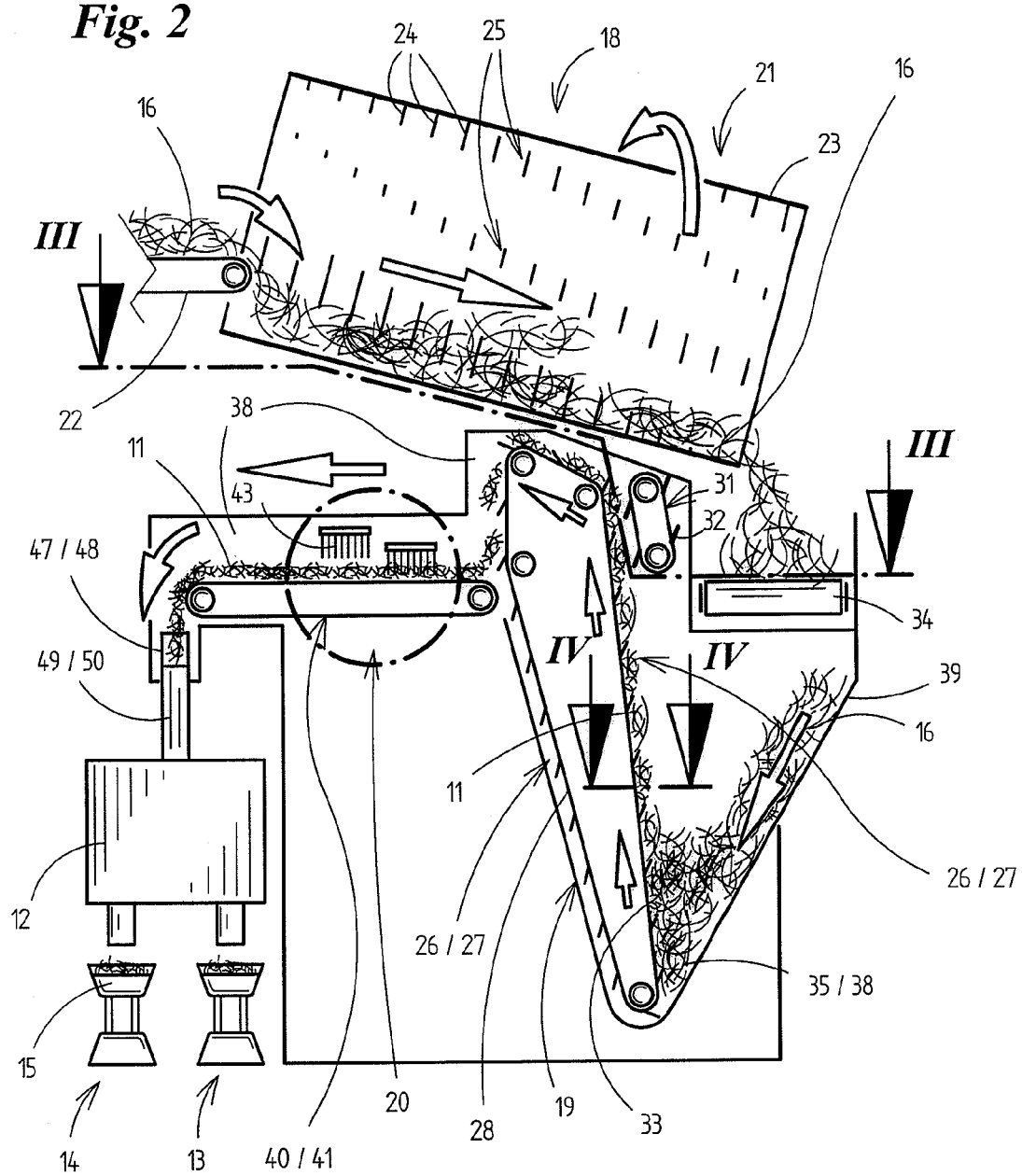
Figure 4:
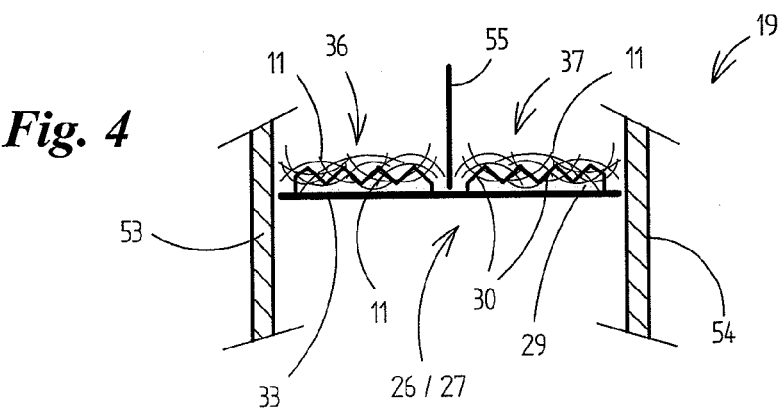
Figure 3:
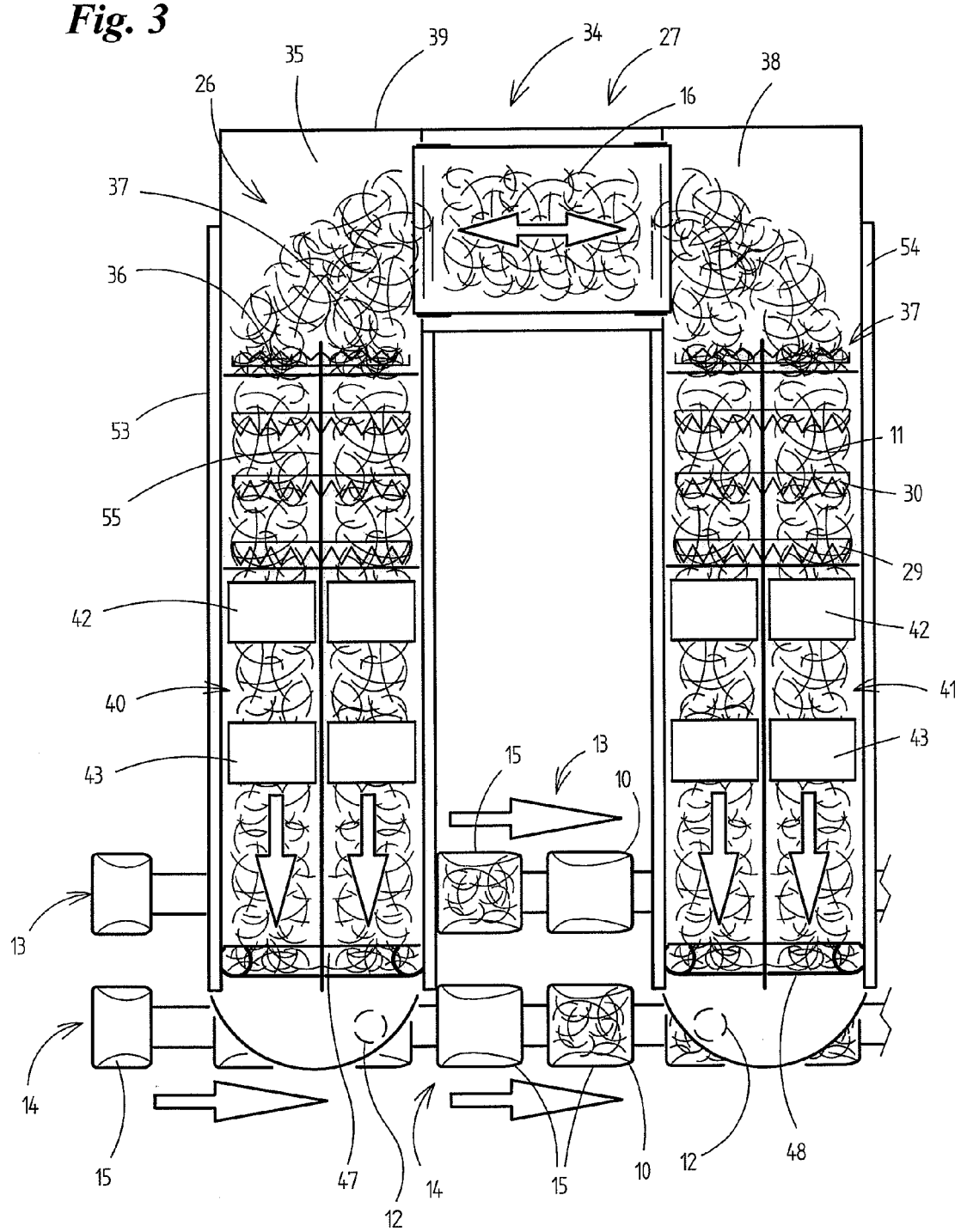
Figure 5:
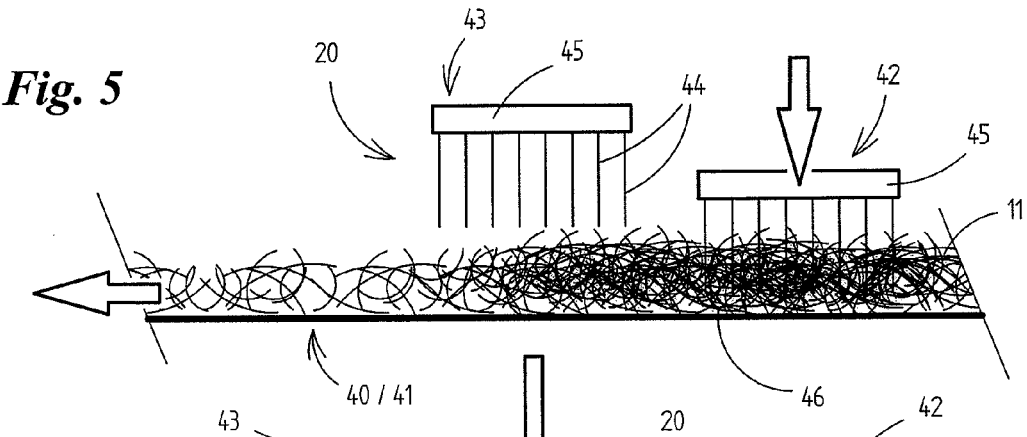
Figure 6:
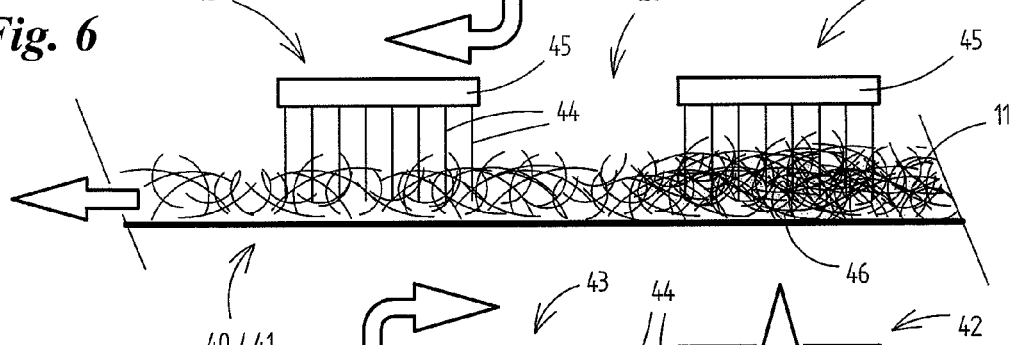
Figure 7:
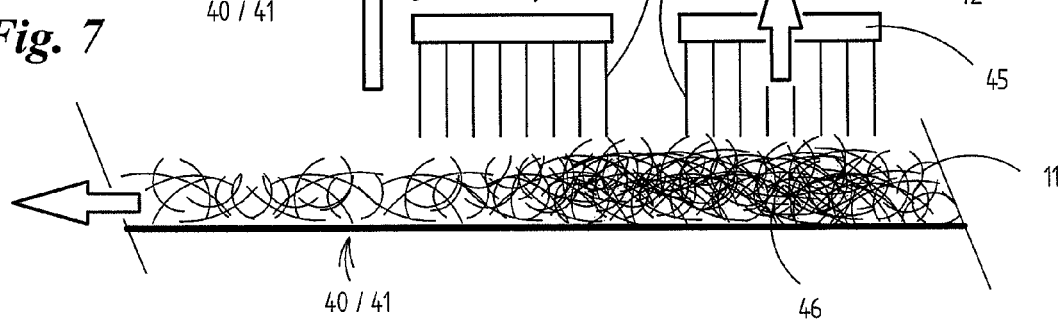
Figure 8:
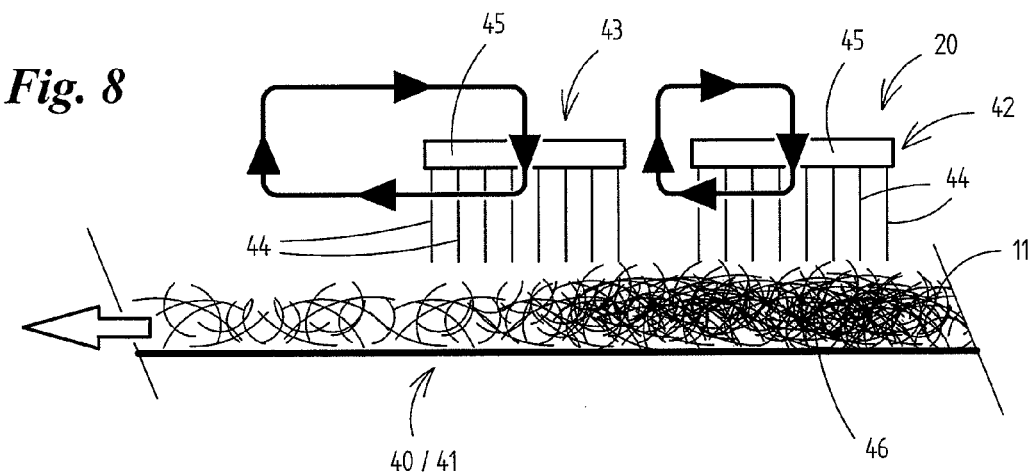

Further details of the apparatus according to the invention are explained more precisely hereinbelow with reference to the exemplary embodiments. In the drawings:

FIG. 1 shows a front view of the apparatus,
FIG. 2 shows the apparatus according to FIG. 1 in a side view and/or in the vertical section corresponding to section plane II-II in FIG. 1,
FIG. 3 shows a detail of the apparatus on an enlarged scale, namely a plan view of a sub-region corresponding to viewing plane III-III in FIG. 2,
FIG. 4 shows, on an enlarged scale, a cross section of a tobacco conveyor along section plane IV-IV from FIG. 2,
FIGS. 5 to 7 show side views of different positions of an operating arrangement for treating a tobacco stream, and
FIG. 8 shows the processing station according to FIGS. 5 to 7 in a different configuration.

For making cut-tobacco portions 10 of equal size and/or equal weight, it is necessary first of all to provide a uniform tobacco strand or tobacco stream 11 which has a homogeneous tobacco-fiber structure, and this strand or stream is fed to tobacco scales 12. In the region of the latter, the tobacco portions 10 are made and transferred to removal conveyors, namely to cup conveyors 13, 14 with cups 15 for a respective tobacco portion 10.

Arranged upstream of the tobacco scales 12 is a unit 17, in the region of which an incoming tobacco stream, namely main stream 16, is homogenized in terms of fiber structure in a plurality of processing stations 18, 19, 20 using mechanical arrangements. The processing stations 18, 19, 20 and the arrangements or tools thereof are coordinated with one another in respect of processing the tobacco. In the region of the processing station 18, the main stream 16 is treated and conveyed. In the region of the processing station 19, the main stream 16 is divided up into a plurality of individual tobacco streams 11, to be precise into four tobacco streams 11, which are separately conveyed on, processed and, finally, each fed to a weighing unit of the tobacco scales 12.

The first processing station 18 comprises a rotating hollow body, namely a drum 21. The main stream 16, which arrives on a feed conveyor 22, is introduced into this drum in the longitudinal direction. The drum 21 is inclined downward in the conveying direction, in which case the tobacco stream 11 is transported through the drum 21 as a result of the latter rotating.

Processing arrangements for loosening and homogenizing the tobacco are arranged on the inside of the drum 21 or of a drum casing 23. These arrangements are constituted by pins or needles 24, which are oriented approximately radially into the interior of the drum 21. The needles 24 are arranged in (six) rows 25, to be precise they wind helically in the longitudinal direction of the drum 21. The rows 25 are preferably arranged such that the windings are directed counter to the direction of rotation of the drum 21. This improves the loosening effect as the tobacco or the main stream 16 is transported through the drum 21.

Once it has left the drum 21, the tobacco stream or main stream 16 passes into the region of the second processing station 19. This comprises at least one tobacco conveyor, in the present example two tobacco conveyors 26, 27 located one beside the other. Each of these tobacco conveyors 26, 27 is part of the processing station 19. For this purpose, each tobacco conveyor 26, 27 comprises an endless belt 28 with elevations, protrusions or carry-along elements 29 arranged on the outside, these entering into the tobacco stream 11. In the present exemplary embodiment, the carry-along elements 29 comprise prong-like or sawtooth-like crosspieces. A multiplicity of these crosspieces or carry-along elements 29 are spaced apart from one another and are arranged on the tobacco conveyor 26, 27 so as to be inclined in the conveying direction. Tooth-like protrusions 30 enter into the tobacco.

The tobacco conveyor 26, 27 interacts with a driven counterpart which is positioned in a stationary manner. This may be a rotating roller having needles or spikes. The exemplary embodiment provides a short belt 31, a combing belt, which is mounted alongside the tobacco the conveyor 26, 27, at a distance therefrom, has protrusions 32 and is driven in the opposite direction to the tobacco conveyor 26, 27. The protrusions 32 are preferably designed in a manner analogous to the carry-along elements 29 and are directed counter to these. Interaction of the tobacco conveyors 26, 27 with the associated belt 31 likewise results in careful loosening of the tobacco. The protrusions 32 are designed and arranged such that they are moved past the protrusions 30 of the tobacco conveyors 26, 27 without coming into contact therewith.

The tobacco conveyor 26, 27 is designed as a steep conveyor with a more or less vertically running conveying strand 33, and is arranged beneath the first processing station 18.

After leaving the drum 21, the tobacco or tobacco stream 16 is fed to an intermediate conveyor, namely to a distributor belt 34. This is directed transversely and spaced apart beneath an exit end of the drum 21. The distributor belt 34, which comprises in particular a single belt strap, distributes the tobacco onto one tobacco conveyor 26, 27 or the other. These are spaced apart from one another. The distributor belt 34 is positioned preferably centrally in relation to the two tobacco conveyors 26, 27.

Each tobacco conveyor 26, 27 is assigned a collecting container 35, 38, which is located at a lower level. This is designed as a hopper-like container which is merely open at the top. An outer wall 39 of the collecting container 35, 38 runs obliquely downward to a receiving region of the tobacco conveyor 26, 27, namely to a bottom deflecting region of the endless belt 28. The distributor belt 34 can be driven in both directions, in which case the tobacco is fed alternately to one collecting container 35, 38 or the other. The degree of filling in the collecting container 35, 38 is expediently monitored, for example by optical or mechanical or electronic sensors. Depending on the degree of filling established, the distributor belt 34 is moved in one direction or the other. The tobacco conveyor 26, 27 constantly removes tobacco from the tobacco supply formed in the region of the collecting container 35, 38, and transports this tobacco upward in the region of the conveying strand 33.

The intermediate conveyor, namely the distributor belt 34, is also important for any possible disturbances to the operation of either of the tobacco conveyors 26, 27. In the event of one of these separate processing lines for the tobacco failing, for example in the event of a set of tobacco scales failing, the drive of the distributor belt 34 can be switched over such that—possibly with reduced conveying speed—tobacco is transported merely to one of the two (functioning) tobacco conveyors 26, 27. The apparatus as a whole then continues at half speed until the disturbance has been eliminated.

One special feature is that the incoming quantity of tobacco, that is to say the original main stream 16, is divided up into a plurality of separate individual streams, namely into the tobacco streams 11. In the present example, the tobacco is divided up in this way in the region of the processing station 19, that is to say by the tobacco conveyor 26, 27. For this purpose, the (two) tobacco conveyors 26, 27 are spaced apart one another. Deflecting and guiding rollers are mounted on side walls 53, 54. Each tobacco conveyor 26, 27, moreover, forms two operating paths 36, 37 which are delimited from one another, in which case four sub-streams or tobacco streams 11 which are delimited from one another are formed in the region of the (two) tobacco conveyors 26, 27. The operating paths 36, 37 are created in each case by an intermediate wall 55 which is arranged centrally in the region of the tobacco conveyors 26, 27, above the conveying strand 33. The separately fastened intermediate walls 55 extend to a point directly adjacent to the conveying strand 33, in which case the tobacco streams 11 formed are effectively delimited from one another. The transversely directed carry-along elements 29 are interrupted in the region of the intermediate wall 55. The delimitation of the tobacco streams 11 prevents the tobacco which has already been loosened from forming lumps again during transportation.

The tobacco conveyors 26, 27 transport the tobacco or the four tobacco streams 11 to the next, third processing station 20. In the region of the latter, the tobacco is transported in a horizontal plane, to be precise on (two) tobacco belts 40, 41. The division into four operating paths 36, 37 with the aid of the intermediate wall 55 is continued in the region of the tobacco belts 40, 41, in a manner analogous to FIG. 4.

In order to homogenize and loosen the tobacco further, needle combs 42, 43 are arranged above the tobacco belts 40, 41 or the tobacco stream 11. Each needle comb 42, 43 comprises a multiplicity of upright needles 44 which are arranged one beside the other in the conveying direction, and transversely thereto, and are spaced apart from one another. The needles 44 are connected to a common rectangular or square carrier 45. Each needle comb 42, 43 or carrier 45 is connected to a mechanism (not shown) which allows the needle comb 42, 43 to move vertically and horizontally. The tobacco is loosened by the needle combs 42, 43 moving relative to the tobacco stream 11 and to one another.

In the embodiment according to FIGS. 5 to 7, one of the needle combs, namely the rear needle comb 42, as seen in the conveying direction of the tobacco, can merely be moved up and down. In the bottom position, the needles 44 are located within the tobacco stream 11 at a certain distance from the tobacco belt 40, 41 (FIGS. 5 and 6). In the top end position, the needles 44 are located outside the tobacco stream 11. The other needle comb 43 can likewise be moved up and down, preferably with the needles 44 penetrating into the tobacco to the same depth in the bottom end position (FIG. 6). The needle comb 43 can also be moved horizontally, to be precise in the conveying direction of the tobacco stream 11 (FIG. 6) and back into the starting position. According to FIGS. 5 to 7, the two needle combs 42, 43 interact such that the needle comb 42 enters into the tobacco stream 11 by moving downward. The needle comb 43, which is spaced apart from the needle comb 42 by a small distance, likewise enters into the tobacco stream 11, and is then moved in the conveying direction of the tobacco stream 11 into a position at a greater distance from the needle comb 42 (FIG. 6). Any tobacco compaction 46 which may form in this region is broken up by this relative movement between the two needle combs 42, 43. In the end position according to FIG. 6, the needle comb 43 is moved upward and is disengaged from the tobacco stream 11. The needle comb 43 then returns into the starting position adjacent to the needle comb 42.

The configuration according to FIG. 8 likewise operates with two needle combs 42, 43 located one beside the other in the conveying direction of the tobacco stream 11. In this version, both needle combs 42, 43 can be moved up and down and also in the conveying direction of the tobacco stream 11. The movement amplitudes once the two needle combs 42, 43 have penetrated into the tobacco stream 11 differ. The rear needle comb 42, as seen in the conveying direction, is moved along a relatively short distance in the transporting direction, and is then moved upward and subsequently back into the starting position. The other needle comb 43 executes basically the same movement, although it moves along a longer distance once it has penetrated into the tobacco stream 11.

Following the (third) treatment station 20, the tobacco stream 11 is conveyed sideways, by transverse conveyors 47, 48 at the end of the tobacco belts 40, 41, into the region of upright vertical tubes 49, 50. These transfer the tobacco, or the respective tobacco stream 11, to the tobacco scales 12, or to a weighing cell of the same. The transverse conveyors 47, 48 are designed as oscillating conveyors.

Vertical tubes or discharge tubes 51, 52 are likewise arranged on the underside of the tobacco scales 12, which, for the scale simplicity, are designed here as cylindrical containers. These vertical or discharge tubes are aligned relative to the cups 15 of the cyclically movable cup conveyors 13, 14.

Optimum results are achieved if the three processing stations are designed in the manner described and are arranged in the given order. Each processing station and the associated arrangements, however, can also be used independently for the purpose of loosening tobacco. The operation of dividing up the fed main stream into a plurality of sub-streams or tobacco streams constitutes a special feature.

LIST OF DESIGNATIONS

10 Tobacco portion
11 Tobacco stream
12 Tobacco scales
13 Cup conveyor
14 Cup conveyor
15 Cup
16 Main stream
17 Unit
18 Processing station
19 Processing station
20 Processing station
21 Drum
22 Feed conveyor
23 Drum casing
24 Needle
25 Rows
26 Tobacco conveyor
27 Tobacco conveyor
28 Endless belt
29 Carry-along element
30 Protrusion
31 Belt
32 Protrusion
33 Conveying strand
34 Distributor belt
35 Collecting container
36 Operating path
37 Operating path
38 Collecting container
39 Outer wall
40 Tobacco belt
41 Tobacco belt
42 Needle comb
43 Needle comb
44 Needle
45 Carrier
46 Tobacco compaction
47 Transverse conveyor
48 Transverse conveyor
49 Vertical tube
50 Vertical tube
51 Discharge tube
52 Discharge tube
53 Side wall
54 Side wall
55 Intermediate wall

The invention claimed is:

1. An apparatus for mechanically preparing fibrous material, in the form of cut tobacco, for forming a uniform, homogeneous fiber or tobacco strand or tobacco stream (11), from which tobacco portions (10) can be severed, characterized in that the tobacco stream (11) forms a main stream (16) and is conveyed through a plurality of processing stations (18, 19, 20) which homogenize the tobacco stream (11, 16) in a number of steps using different arrangements; and in that a first processing station (18) of said plurality of processing stations has a drum (21) with projecting needles (24) which are arranged in rows (25) on the inside of a drum casing (23) and, when the drum (21) rotates, enter into the tobacco as the latter is transported.

2. The apparatus as claimed in claim 1, characterized in that the rows (25) of needles (24) are arranged in helical lines, in particular in six to eight rows distributed along the circumference of the drum casing (23), the direction of the windings being counter to the direction of rotation of the drum (21).

3. The apparatus as claimed in claim 1, characterized in that the drum (21) is inclined downward in the conveying direction of the tobacco such that the tobacco can be conveyed through the drum (21) without any additional conveying means.

4. An apparatus with a plurality of processing stations (18, 19, 20) for mechanically preparing fibrous material, the form of cut tobacco, for forming a uniform, homogeneous fiber or tobacco stream (11), from which tobacco portions (10) are severed in a region of tobacco scales (12), characterized by the following features:

a) a first processing station (18) has a drum (21) which points in a longitudinal conveying direction of the tobacco stream (11) and through which the tobacco stream is conveyed in the longitudinal direction, b) a drum casing (23) of the drum (21) has projecting needles (24) that are arranged on the inside of a drum casing (23) and which, when the drum (21) rotates, enter into the tobacco stream (11) as the latter is transported, c) the drum (21) is inclined downward in the conveying direction of the tobacco stream (11) such that the tobacco stream (11) is conveyed through the drum (21) in the longitudinal direction without any additional conveying means, d) the tobacco stream (11) coming from the drum (21) is fed to a further processing station (20) in which the tobacco stream (11) is processed on tobacco belts (40, 41) in a region of a horizontal conveying plane by a plurality of needle combs (42, 43), which are introduced from above into the transported tobacco stream (11), thus causing the tobacco to be loosened by the movement of the needle combs (42, 43) relative to one another and/or to the tobacco stream (11), and e) following the processing station (20) with needle combs (42, 43), the tobacco stream (11) is fed by the tobacco belts (40, 41) to the tobacco scales (12).

5. The apparatus as claimed in claim 4, characterized in that a second processing station (19) has at least one tobacco conveyor (26, 27) which receives tobacco following its exit from the first processing station (18), and transports it, in an essentially upright transporting plane, with the aid of carry-along elements (29) arranged on the tobacco conveyor (26, 27).

6. The apparatus as claimed in claim 5, characterized in that the tobacco conveyor (26, 27) interacts with a movable counterpart comprising a belt (31) with protrusions (32) which is driven counter to the conveying direction of the tobacco conveyor (26).

7. The apparatus as claimed in claim 5, characterized in that at least two tobacco conveyors (26, 27) are arranged one beside the other and are driven synchronously, so that the tobacco is fed to them via a transfer conveyor comprising a transversely directed distributor belt (34) which can be controlled in respect of conveying speed and/or conveying direction.

8. The apparatus as claimed in claim 7, characterized in that tobacco coming from the first processing station (18) is transported by the distributor belt (34) alternately into a collecting container (35, 38) assigned to each tobacco conveyor (26, 27), so that the distributor belt (34) is controlled in accordance with the degree of filling of the collecting container (35, 38).

9. The apparatus as claimed in claim 5, characterized in that a region of the second processing station (19) contains a plurality of operating paths (36, 37), namely two operating paths (36, 37) for each tobacco conveyor (26, 27), so that a separate tobacco substream (11) is conveyed along each operating path (36, 37).

10. The apparatus as claimed in claim 5, characterized in that, in a region of a third processing station (20), the tobacco stream (11) is processed by a plurality of needle combs (42, 43), which are introduced from above into the tobacco stream (11), transported in a horizontal plane, and cause the tobacco to be loosened by moving relative to one another and/or to the tobacco stream (11).

11. The apparatus as claimed in claim 10, characterized in that each tobacco stream (11) is assigned two needle combs (42, 43) which follow one after the other in the conveying direction and have needles (44) entering into the tobacco stream (11) simultaneously from above, so that the needle combs (42, 43) are moved relative to one another in the conveying direction of the tobacco stream (11).

12. The apparatus as claimed in claim 11, characterized in that one needle comb (42), following entry into the tobacco stream (11), remains stationary therein, or executes a small movement in the conveying direction, and the other needle comb (43), following entry of the needles (44) into the tobacco stream (11), executes a larger movement in the transporting direction of the tobacco stream (11), so that the needle combs (42, 43) are moved back out of the tobacco stream (11) by way of an upward movement.

13. The apparatus as claimed in claim 11, characterized in that the plurality of tobacco streams (11), once they have left the third processing station (20), are conveyed in the transverse direction to a respectively associated vertical tube (49, 50) for transfer to the tobacco scales (12).

14. An apparatus with a plurality of processing stations (18, 19, 20) for mechanically preparing fibrous material, in the form of cut tobacco, for forming a uniform, homogeneous fiber or tobacco stream (11), from which tobacco portions (10) are severed in a region of tobacco scales (12), characterized by the following features:
  a) in a first processing station (18) the tobacco stream (11) is conveyed in an axial direction through a drum, which has projecting needles (24) that are arranged on the inside of a drum casing (23) and that, when the drum (21) rotates, enter into the tobacco stream (11) as the latter is transported,
  b) the drum (21) is inclined downward in a conveying direction of the tobacco stream (11) such that the tobacco stream (11) is conveyed through the drum (21) in a longitudinal direction without any additional conveying means,
  c) in a second processing station (19) the tobacco stream (11) coming from the drum (21) is introduced into a collecting container (35, 38) and fed from the latter to a downstream third processing station (20) by means of a tobacco conveyor (26, 27) conveying in the upward direction, with the tobacco conveyor (26, 27) having carry-along elements (29) which collect the tobacco in the collecting container (35, 38) and transport it in the upward direction,
  d) in the third processing station (20), the tobacco stream (11) is processed on tobacco belts (40, 141) in a region of a horizontal conveying plane by a plurality of needle combs (42, 43), which are introduced from above into the transported tobacco stream (11), thus causing the tobacco to be loosened by the movement of the needle combs (42, 43) relative to one another and/or to the tobacco stream (11), and
  e) following the processing station (20) with needle combs (42, 43), the tobacco stream (11) is fed to the tobacco scales (12).

* * * * *